(12) United States Patent
Kubota et al.

(10) Patent No.: US 6,930,376 B2
(45) Date of Patent: Aug. 16, 2005

(54) SEMICONDUCTOR DEVICE HAVING A FOLDED LAYER STRUCTURE

(75) Inventors: Kazuyoshi Kubota, Kyoto (JP); Pablo O. Vaccaro, Kyoto (JP); Tahito Aida, Kyoto (JP)

(73) Assignee: ATR Advanced Telecommunications Research Institute International, Kyoto (JP)

( * ) Notice: Subject to any disclaimer, the term of this patent is extended or adjusted under 35 U.S.C. 154(b) by 65 days.

(21) Appl. No.: 10/361,852

(22) Filed: Feb. 11, 2003

(65) Prior Publication Data

US 2003/0173583 A1 Sep. 18, 2003

(30) Foreign Application Priority Data

Feb. 13, 2002 (JP) ........................................ 2002-035995

(51) Int. Cl.[7] ................................................ H01L 29/06
(52) U.S. Cl. ........................ 257/622; 257/623; 257/190; 438/978
(58) Field of Search ................................ 257/622, 623, 257/190; 438/978

(56) References Cited

U.S. PATENT DOCUMENTS

| | | | | |
|---|---|---|---|---|
| 4,830,984 A | * | 5/1989 | Purdes ........................ | 438/492 |
| 5,613,022 A | * | 3/1997 | Odhner et al. ................ | 385/37 |
| 5,855,998 A | * | 1/1999 | Tanabe et al. ............... | 428/216 |
| 6,051,063 A | * | 4/2000 | Tanabe et al. ................ | 117/89 |
| 6,221,739 B1 | * | 4/2001 | Gorelik ...................... | 438/455 |
| 6,534,838 B1 | * | 3/2003 | Vaccaro ...................... | 257/415 |
| 6,646,364 B1 | * | 11/2003 | Horning et al. ............. | 310/309 |
| 2003/0173583 A1 | | 9/2003 | Kubota | |

FOREIGN PATENT DOCUMENTS

JP 08114408 A * 5/1996 ............ G01B/7/16

* cited by examiner

*Primary Examiner*—George Eckert
*Assistant Examiner*—Eugene Lee
(74) *Attorney, Agent, or Firm*—Westerman, Hattori, Daniels & Adrian, LLP (57) ABSTRACT

An upper reflecting layer in a main region, a first support region and a second support region is separated from an upper reflecting layer in the surrounding region by separating grooves. The first support region and the second support region are folded in a valley shape from a substrate at grooves, and the first support region, the second support region and the main region are folded in a mountain shape, and the upper reflecting layer in the main region faces parallel to the substrate with spacing.

13 Claims, 7 Drawing Sheets

SEMICONDUCTOR DEVICE HAVING A FOLDED LAYER STRUCTURE

BACKGROUND OF THE INVENTION

1. Field of the Invention

The present invention relates to a semiconductor device constructed by a pair of opposed layers, a semiconductor device constructed by folding layers in a mountain shape and a valley shape, and a method of fabricating the same.

2. Description of the Background Art

Micro-optical benches having a standing structure are realized by micromachining techniques using silicon. It has been reported that resonance microscanners for laser scanning displays, movable microreflectors, and scanning micromirrors for external resonators of semiconductor lasers, for example, are fabricated using the micromachining techniques.

In the conventional micromachining techniques, after parts of stacked semiconductor layers are stripped by etching, the stripped parts are slid to stand, and are joined by a hinge, thereby forming a standing structure. Mirrors or the like standing at predetermined angles are constructed on a substrate using the standing structure.

When the standing structure is fabricated by semiconductors using the conventional micromachining techniques, however, wear is generated in sliding the stripped semiconductor layers. Further, it is difficult to accurately slide the semiconductor layers to a predetermined position. Therefore, it is difficult to accurately control the angle and the position of each of members constituting the standing structure, and the workability is poor.

Particularly, in the optical resonators, a pair of reflecting layers must be accurately opposed parallel to each other. Accordingly, it is difficult to fabricate optical resonators using the conventional micromachining techniques.

It is also difficult to fabricate complicated structures by folding the layers in a mountain shape and a valley shape.

SUMMARY OF THE INVENTION

An object of the present invention is to provide a semiconductor device that can be obtained by causing a pair of layers accurately in parallel with each other, and can be miniaturized and can be easily fabricated.

Another object of the present invention is accurately to provide a method of fabricating a semiconductor device that can be obtained by causing a pair of layers to face in parallel with each other, and can be miniaturized and can be easily fabricated.

Still another object of the present invention is to provide a semiconductor device which is formed by folding layers in a mountain shape and a valley shape, and can be miniaturized and can be easily fabricated.

A further object of the present invention is to provide a method of fabricating a semiconductor device which is formed by folding layers in a mountain shape and a valley shape, and can be miniaturized and can be easily fabricated.

A semiconductor device according to an aspect of the present invention comprises a substrate; a first layer; a second layer; and a third layer in this order, the second layer comprising a stacked structure of a plurality of semiconductor layers having different lattice constants respectively, the third layer comprising a main region, a first support region and a second support region, the first and second support regions respectively connecting with the main region through first and second lines and respectively connecting with the surrounding region through third and fourth lines, the first, second, third and fourth lines being arranged parallel to each other, a separating groove having a depth reaching to the first layer from the third layer so as to surround the main region, the first support region and the second support region in a portion excluding the first, second, third and fourth lines, and the first layer in the main region, the first support region and the second support region being selectively removed, and the second layer being folded in a valley shape at the third and fourth lines and folded in a mountain shape at the first and second lines by a strain exerted in the second layer, the first and second support regions standing on the third layer on the substrate, and the main region being opposed to the substrate with spacing.

In the semiconductor device according to the present invention, the third layer, the second layer and the first layer are removed at the separating groove surrounding the main region, the first support region and the second support region in the portion excluding the first, second, third and fourth lines, and the first layer in the main region, the first support region and the second support region is removed. Accordingly, the main region enters a released state while being linked to the surrounding region only through the first support region and the second support region.

The respective lattice constants of the plurality of semiconductor layers in the second layer differ from one another. Accordingly, a strain due to the difference in the lattice constant is induced in the second layer. Consequently, the second layer is folded in a valley shape at the third line and the fourth line and is folded in a mountain shape at the first line and the second line so as to relieve the strain. Therefore, the first support region and the second support region stand on the third layer on the substrate, and the main region faces the substrate with spacing.

The second layer is thus folded in a valley shape and a mountain shape while keeping a parallelogram among the main region, the first support region, the second support region and the substrate. Accordingly, the main region can face parallel to the substrate.

The second layer is automatically folded so as to relieve the strain caused by the difference in the lattice constant among the plurality of semiconductor layers. Therefore, it is possible to easily fabricate a small-sized semiconductor device comprising a pair of facing reflecting layers in a simple process.

The third layer may comprise a first reflecting layer, a second reflecting layer may be provided between the substrate and the first layer, and the first reflecting layer in the main region may face the second reflecting layer on the substrate.

In this case, the first reflecting layer in the main region can face accurately parallel to the second reflecting layer on the substrate. Consequently, an optical resonator can be constructed.

The third layer may comprise a reflecting layer, and the reflecting layer in the main region may face partially the reflecting layer in the surrounding region.

In this case, the first reflecting layer in the main region can face accurately parallel to the first reflecting layer on the substrate. Consequently, an optical resonator can be constructed.

The second layer may comprise a first semiconductor layer having a first lattice constant, a second semiconductor layer having a second lattice constant smaller than the first lattice constant, and a third semiconductor layer having a third lattice constant larger than the second lattice constant. The third layer at the third and fourth lines and the third semiconductor layer may be removed such that the second layer is folded in a valley shape at the third and fourth lines, and the third layer may be removed at the first and second lines such that the second layer is folded in a mountain shape at the first and second lines.

In this case, when the third layer at the third and fourth lines and the third semiconductor layer are removed, the second layer is folded in a valley shape at the third and fourth lines so as to relieve the strain caused by the difference between the first lattice constant of the first semiconductor layer and the second lattice constant of the second semiconductor layer. Further, when the third layer is removed at the first and second lines, the second layer is folded in a mountain shape at the first and second lines so as to relieve the strain caused by the difference between the third lattice constant of the third semiconductor layer and the second lattice constant of the second semiconductor layer.

The semiconductor device may further comprise a driving part for changing the respective angles of the first and second support regions which stand on the third layer on the substrate.

In this case, the distance between the third layer in the main region and the substrate can be easily changed by changing the respective angles of the first and second support regions.

The driving part may comprise a driving force generation part for changing the respective angles of the first and second support regions by a driving force comprising an electrostatic force or an electromagnetic force. In this case, the distance between the third layer in the main region and the substrate can be easily changed.

The first support region may comprise a plurality of first support regions, and the second support region comprises a plurality of second support regions. In this case, the third layer in the main region can stably face the substrate.

A semiconductor device according to another aspect of the present invention comprises a first layer; a second layer; and a third layer in this order, the second layer comprising a first semiconductor layer having a first lattice constant, a second semiconductor layer having a second lattice constant smaller than the first lattice constant, and a third semiconductor layer having a third lattice constant larger than the second lattice constant, a separating groove having a depth reaching to the first layer from the third layer being formed so as to partially surround a predetermined region, and the first layer in the predetermined region being selectively removed, and the third layer and the third semiconductor layer at the first line being removed such that the second layer is folded in a valley shape in the predetermined region, and the third layer at the first line being removed at the second line such that the second layer is folded in a mountain shape at the second line in the predetermined region.

In the semiconductor device according to the present invention, the third layer, the second layer and the first layer are removed at the separating groove partially surrounding the predetermined region, and the first layer in the predetermined region is removed. Accordingly, the predetermined region enters a released state while being linked to the surrounding region only in its part.

The respective lattice constants of the first semiconductor layer, the second semiconductor layer and the third semiconductor layer in the second layer differ from one another. Accordingly, a strain due to the difference in the lattice constant is induced in the second layer. When the third layer at the first line and the third semiconductor layer are removed, the second layer is folded in a valley shape at the first line so as to relieve the strain caused by the difference between the first lattice constant of the first semiconductor layer and the second lattice constant of the second semiconductor layer. Further, when the third layer is removed at the second line, the second layer is folded in a mountain shape at the second line so as to relieve the strain caused by the difference between the third lattice constant of the third semiconductor layer and the second lattice constant of the second semiconductor layer.

The second layer is thus automatically folded in a valley shape and a mountain shape so as to relieve the strain caused by the difference in the lattice constant among the plurality of semiconductor layers. Therefore, the layers can be folded in a mountain shape and a valley shape in a simple process, thereby making it possible to miniaturize and easily fabricate the semiconductor device.

A method of fabricating a semiconductor device according to another aspect of the present invention comprises the steps of forming a first layer on a substrate; forming on the first layer a second layer comprising a stacked structure of a plurality of semiconductor layers having different lattice constants respectively; forming a third layer on the second layer; forming on the third layer the first, second, third and fourth lines which are arranged parallel to one another, to provide a main region and provide first and second support regions connecting with the main region through the first and second lines respectively and connecting with the surrounding region through the third and fourth lines respectively; forming a separating groove having a depth reaching the first layer from the third layer so as to surround the main region, the first support region and the second support region in a portion excluding the first, second, third and fourth lines; selectively removing the first layer in the main region and the first and second support regions; and folding the second layer in a valley shape at the third and fourth lines and folding the second layer in a mountain shape at the first and second lines by a strain exerted in the second layer, causing the first and second support regions to stand on the third layer on the substrate, and causing the main region to face the substrate with spacing.

In the method of fabricating the semiconductor device according to the present invention, the third layer, the second layer and the first layer are removed at the separating groove surrounding the main region, the first support region and the second support region in the portion excluding the first, second, third and fourth lines, and the first layer in the main region, the first support region and the second support region is removed. Accordingly, the main region enters a released state while being linked to the surrounding region only through the first support region and the second support region.

The respective lattice constants of the plurality of semiconductor layers in the second layer differ from one another. Accordingly, a strain due to the difference in the lattice constant is induced in the second layer. Consequently, the second layer is folded in a valley shape at the third line and the fourth line and is folded in a mountain shape at the first line and the second line so as to relieve the strain. Consequently, the first support region and the second support region stand on the third layer on the substrate, and the main region faces to the substrate with spacing.

The second layer is thus folded in a valley shape and a mountain shape while keeping a parallelogram among the main region, the first support region, the second support region and the substrate, thereby making it possible to accurately cause the main region to face parallel to the substrate.

The second layer is automatically folded so as to relieve the strain caused by the difference in the lattice constant among the plurality of semiconductor layers. Therefore, it is possible to easily fabricate a small-sized semiconductor device comprising a pair of opposed reflecting layers in a simple process.

The fabricating method may further comprise the step of forming a second reflecting layer between the substrate and the first layer, the step of forming the third layer comprising the step of forming the third layer comprising a reflecting layer, and the step of causing the main region to face comprising the step of causing the main region to face the substrate with spacing such that the reflecting layer in the main region faces the reflecting layer on the substrate.

In this case, the reflecting layer in the main region can face accurately parallel to the reflecting layer on the substrate. Consequently, an optical resonator can be constructed.

The step of forming the third layer may comprise the step of forming the third layer comprising the reflecting layer, and the step of causing the main region to face may comprise the step of causing the main region to face the substrate with spacing such that the reflecting layer in the main region faces partially the reflecting layer in the surrounding region.

In this case, the first reflecting layer in the main region can face accurately parallel to the first reflecting layer partially on the substrate. Consequently, an optical resonator can be constructed.

The step of forming the second layer may comprise the step of forming a second layer comprising a first semiconductor layer having a first lattice constant, a second semiconductor layer having a second lattice constant smaller than the first lattice constant, and a third semiconductor layer having a third lattice constant larger than the second lattice constant, and the step of causing the main region to face may comprise the step of removing the third layer and the third semiconductor layer at the third and fourth lines such that the second layer is folded in a valley shape at the third and fourth lines, and removing the third layer at the first and second lines such that the second layer is folded in a mountain shape at the first and second lines.

In this case, when the third layer at the third and fourth lines and the third semiconductor layer are removed, the second layer is folded in a valley shape at the third and fourth lines so as to relieve the strain caused by the difference between the first lattice constant of the first semiconductor layer and the second lattice constant of the second semiconductor layer. Further, when the third layer is removed at the first and second lines, the second layer is folded in a mountain shape at the first and second lines so as to relieve the strain caused by the difference between the third lattice constant of the third semiconductor layer and the second lattice constant of the second semiconductor layer.

The fabricating method may further comprise the step of providing a driving part for changing the respective angles of the first and second support regions which stand on the third layer on the substrate.

In this case, the distance between the third layer in the main region and the substrate can be changed by changing the respective angles of the first and second support regions.

The step of providing the driving part may comprise the step of providing a driving force generation part for changing the respective angles of the first and second support regions by a driving force comprising an electrostatic force or an electromagnetic force. In this case, the distance between the third layer in the main region and the substrate can be easily changed.

The step of providing the first and second support regions may comprise the step of providing a plurality of first support regions and a plurality of second support regions. In this case, the third layer in the main region can stably face the substrate.

A method of fabricating a semiconductor device according to still another aspect of the present invention comprises the steps of forming a first layer; forming on the first layer a second layer comprising a first semiconductor layer having a first lattice constant, a second semiconductor layer having a second lattice constant smaller than the first lattice constant, and a third semiconductor layer having a third lattice constant larger than the second lattice constant; forming a third layer on the second layer; forming a separating groove having a depth reaching the first layer from the third layer so as to partially surround a predetermined region; selectively removing the first layer in the predetermined region; and removing the third layer and the third semiconductor layer at the first line such that the second layer is folded in a valley shape at the first line in the predetermined region, and removing the third layer at the second line such that the second layer is folded in a mountain shape at the second line in the predetermined region.

In the method of fabricating the semiconductor device according to the present invention, the third layer, the second layer, and the first layer are removed at the separating groove partially surrounding the predetermined region, and the first layer in the predetermined region is removed. Accordingly, the predetermined region enters a released state while being linked to the surrounding region only in its part.

The respective lattice constants of the first semiconductor layer, the second semiconductor layer and the third semiconductor layer in the second layer differ from one another. Accordingly, a strain due to the difference in the lattice constant is induced in the second layer. When the third layer at the first line and the third semiconductor layer are removed, the second layer is folded in a valley shape at the first line so as to relieve the strain caused by the difference between the first lattice constant of the first semiconductor layer and the second lattice constant of the second semiconductor layer. Further, when the third layer is removed at the second line, the second layer is folded in a mountain shape at the second line so as to relieve the strain caused by the difference between the third lattice constant of the third semiconductor layer and the second lattice constant of the second semiconductor layer.

The second layer is thus automatically folded in a valley shape and a mountain shape so as to relieve the strain caused by the difference in the lattice constant among the plurality of semiconductor layers. Therefore, the layers can be folded in a mountain shape and a valley shape in a simple process, thereby making it possible to miniaturize and easily fabricate the semiconductor device.

A semiconductor device according to still another aspect of the present invention comprises a first layer; a second layer; and a third layer in this order, the second layer comprising a stacked structure of a plurality of semiconductor layers having different lattice constants respectively, a separating groove having a depth reaching to the first layer from the third layer being formed so as to partially surround a predetermined region, and the first layer in the predetermined region being selectively removed, and a groove having a first depth being formed at a first line such that the second layer is folded in a valley shape at the first line by a strain exerted in the second layer in the predetermined region, and a groove having a second depth different from the first depth being formed at a second line such that the second layer is folded in a mountain shape at the second line by the strain exerted in the second layer in the predetermined region.

In the semiconductor device according to the present invention, the third layer, the second layer and the first layer are removed at the separating groove partially surrounding the predetermined region. Accordingly, the predetermined region enters a released state while being linked to the surrounding region only at the first line.

The respective lattice constants of the plurality of semiconductor layers in the second layer differ from one another. Accordingly, a strain due to the difference in the lattice constant is induced in the second layer. The groove having the first depth is formed at the first line, so that the second layer is folded in a valley shape at the first line so as to relieve the strain exerted in the second layer. The groove having the second depth is formed at the second line, so that the second layer is folded in a mountain shape at the second line so as to relieve the strain exerted in the second layer.

The second layer is thus automatically folded in a valley shape and a mountain shape so as to relieve the strain caused by the difference in the lattice constant among the plurality of semiconductor layers. Therefore, a semiconductor device folded in a valley shape and a mountain shape can be easily fabricated in a simple process.

The second layer may comprise a first semiconductor layer having a first lattice constant, a second semiconductor layer having a second lattice constant smaller than the first lattice constant, and a third semiconductor layer having a third lattice constant larger than the second lattice constant in this order.

A semiconductor device according to still another aspect of the present invention comprises a stacked structure of a plurality of semiconductor layers having different lattice constants respectively, and a groove having a predetermined depth being formed at a predetermined line such that the stacked structure is folded in a mountain shape at the line by a strain exerted in the stacked structure.

In the semiconductor device according to the present invention, the respective lattice constants of the plurality of semiconductor layers in the stacked structure differ from one another. Accordingly, a strain due to the difference in the lattice constant is induced in the stacked structure. The groove having the predetermined depth is formed at the predetermined line, so that the stacked structure is automatically folded in a mountain shape at the line so as to relieve the strain exerted in the stacked structure. Therefore, a semiconductor device folded in a valley shape can be easily fabricated in a simple process.

A semiconductor device according to still another aspect of the present invention comprises a stacked structure of a plurality of semiconductor layers having different lattice constants respectively, and a groove having a predetermined depth being formed at a predetermined line such that the stacked structure is folded in a valley shape at the line by a strain exerted in the stacked structure.

In the semiconductor device according to the present invention, the respective lattice constants of the plurality of semiconductor layers in the stacked structure differ from one another. Accordingly, a strain due to the difference in the lattice constant is induced in the stacked structure. The groove having the predetermined depth is formed at the predetermined line, so that the stacked structure is automatically folded in a valley shape at the line so as to relieve the strain exerted in the stacked structure. Therefore, a semiconductor device folded in a mountain shape can be easily fabricated in a simple process.

A semiconductor device according to still another aspect of the present invention comprises a stacked structure of a plurality of semiconductor layers having different lattice constants respectively, a groove having a first depth being formed at a first line such that the stacked structure is folded in a valley shape at the first line by a strain exerted in the stacked structure; and a groove having a second depth being formed at a second line such that the stacked structure is folded in a mountain shape at the second line by the strain exerted in the stacked structure.

In the semiconductor device according to the present invention, the respective lattice constants of the plurality of semiconductor layers differ from one another. Accordingly, a strain due to the difference in the lattice constant is induced in the stacked structure. The groove having the first depth is formed at the first line, so that the stacked structure is folded in a valley shape at the first line so as to relieve the strain exerted in the stacked structure. The groove having the second depth is formed at the second line, so that the stacked structure is automatically folded in a mountain shape at the second line so as to relieve the strain exerted in the stacked structure. Therefore, a semiconductor device folded in a valley shape and a mountain shape can be easily fabricated in a simple process.

A method of fabricating a semiconductor device according to still another aspect of the present invention comprises the steps of forming a first layer; forming on the first layer a second layer comprising a stacked structure of a plurality of semiconductor layers having different lattice constants respectively; forming a third layer on the second layer; forming a separating groove having a depth reaching to the first layer from the third layer so as to partially surround a predetermined region, and selectively removing the first layer in the predetermined region; forming a groove having a first depth at a first line such that the second layer is folded in a valley shape at the first line by a strain exerted in the second layer in the predetermined region; and forming a groove having a second depth at a second line such that the second layer is folded in a mountain shape at the second line by the strain exerted in the second layer in the predetermined region.

In the method of fabricating the semiconductor device according to the present invention, the third layer, the second layer and the first layer are removed at the separating groove partially surrounding the predetermined region. Accordingly, the predetermined region enters a released state while being linked to the surrounding region only at the first line.

The respective lattice constants of the plurality of semiconductor layers in the second layer differ from one another. Accordingly, a strain due to the difference in the lattice constant is induced in the second layer. The groove having the first depth is formed at the first line, so that the second layer is folded in a valley shape at the first line so as to relieve the strain exerted in the second layer. The groove having the second depth is formed at the second line, so that the second layer is folded in a mountain shape at the second line so as to relieve the strain exerted in the second layer.

The second layer is thus automatically folded in a valley shape and a mountain shape so as to relieve the strain caused by the difference in the lattice constant among the plurality of semiconductor layers. Therefore, a semiconductor device folded in a valley shape and a mountain shape can be easily fabricated in a simple process.

A method of fabricating a semiconductor device according to still another aspect of the present invention comprises the steps of forming a stacked structure of a plurality of semiconductor layers having different lattice constants respectively; and forming a groove having a predetermined depth at a predetermined line such that the stacked structure is folded in a mountain shape at the line by a strain exerted in the stacked structure.

In the method of fabricating the semiconductor device according to the present invention, the respective lattice constants of the plurality of semiconductor layers in the stacked structure differ from one another. Accordingly, a strain due to the difference in the lattice constant is induced in the stacked structure. The groove having the predetermined depth is formed at the predetermined line, so that the stacked structure is automatically folded in a mountain shape at the line so as to relieve the strain exerted in the stacked structure. Therefore, a semiconductor device folded in a valley shape can be easily fabricated in a simple process.

A method of fabricating a semiconductor device according to still another aspect of the present invention comprises the steps of forming a stacked structure of a plurality of semiconductor layers having different lattice constants respectively; and forming a groove having a predetermined depth at a predetermined line such that the stacked structure is folded in a valley shape at the line by a strain exerted in the stacked structure.

In the method of fabricating the semiconductor device according to the present invention, the respective lattice constants of the plurality of semiconductor layers differ from one another. Accordingly, a strain due to the difference in the lattice constant is induced in the stacked structure. The groove having the predetermined depth is formed at the predetermined line, so that the stacked structure is automatically folded in a mountain shape at the line so as to relieve the strain exerted in the stacked structure. Therefore, a semiconductor device folded in a mountain shape can be easily fabricated in a simple process.

A method of fabricating a semiconductor device according to still another aspect of the present invention comprises the steps of forming a stacked structure of a plurality of semiconductor layers having different lattice constants respectively; forming a groove having a first depth at a first line such that the stacked structure is folded in a valley shape at the first line by a strain exerted in the stacked structure; and forming a groove having a second depth different from the first depth at a second line such that the stacked structure is folded in a mountain shape at the second line by the strain exerted in the stacked structure.

In the method of fabricating the semiconductor device according to the present invention, the respective lattice constants of the plurality of semiconductor layers differ from one another. Accordingly, a strain due to the difference in the lattice constant is induced in the stacked structure. The groove having the first depth is formed at the first line, so that the stacked structure is automatically folded in a valley shape at the first line so as to relieve the strain exerted in the stacked structure. The groove having the second depth is formed at the second line, so that the stacked structure is automatically folded in a mountain shape at the second line so as to relieve the strain exerted in the stacked structure. Therefore, a semiconductor device folded in a valley shape and a mountain shape can be easily fabricated in a simple process.

The semiconductor device may include an arbitrary number of the above moutain shaped folds formed by folding the stacked structure at lines along arbitrary directions and an arbitrary number of the valley shaped folds formed by folding the stacked structure at lines along arbitrary directions in arbitrary order.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
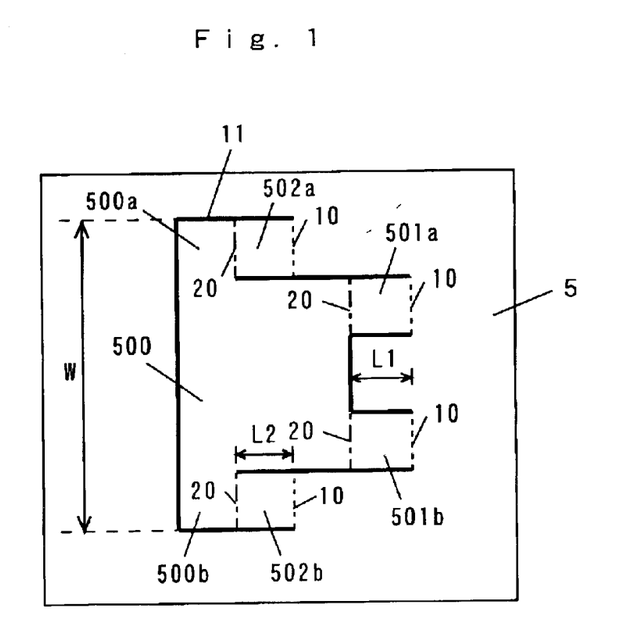
FIG. 1 is a schematic plan view showing a state where an upper reflecting layer has not stood yet in a semiconductor device according to an embodiment of the present invention.
Figure 2:
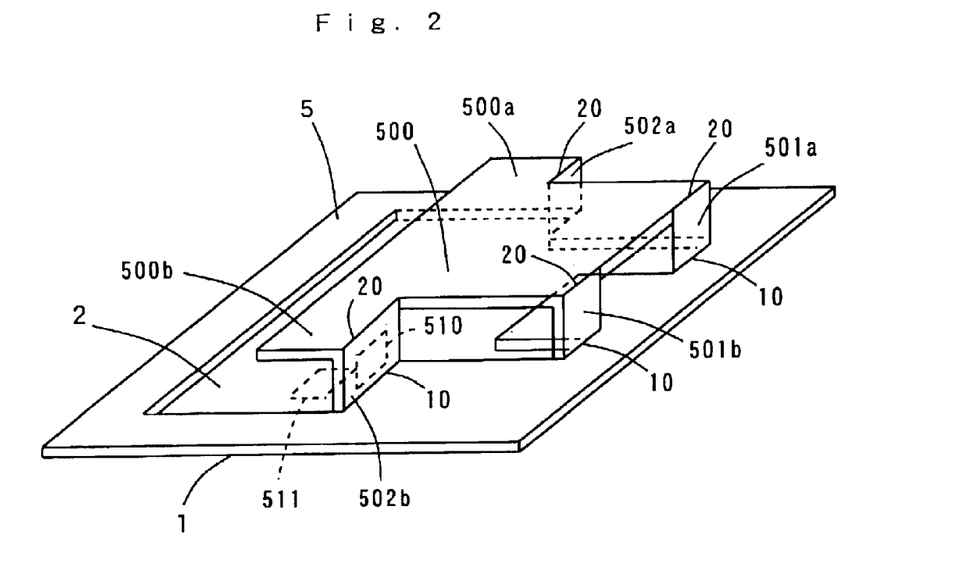
FIG. 2 is a schematic perspective view showing a state where the upper reflecting layer has already stood in the semiconductor device shown in FIG. 1.

FIG. 1 is a schematic plan view showing a state where an upper reflecting layer has not stood yet in a semiconductor device according to an embodiment of the present invention, and FIG. 2 is a schematic perspective view showing a state where the upper reflecting layer has already stood in the semiconductor device shown in FIG. 1.

The semiconductor device according to the present embodiment is an optical resonator which is constituted by two plane mirrors facing parallel to each other.

In FIG. 1, an upper reflecting layer 5, described later, is formed on a substrate 1. The upper reflecting layer 5 is provided with an approximately T-shaped main region 500, a pair of rectangular first support regions 501a and 501b, and a pair of rectangular second support regions 502a and 502b. The main region 500 has rectangular projected regions 500a and 500b on both sides of a rectangular region at its center.

The first support regions 501a and 501b connect with one of end sides of the main region 500 through grooves 20 indicated by one-dot and dash lines, and connect with the surrounding region through grooves 10 indicated by dotted lines. The second support regions 502a and 502b connect with respective one sides of the projected regions 500a and 500b in the main region 500 through the grooves 20 indicated by the one-dot and dash lines, and connect with the surrounding region through the grooves 10 indicated by the dotted lines. The grooves 10 and the grooves 20 extend parallel to each other.

A separating grooves 11 indicated by thick solid lines are formed along the one end side, both sides and the other end side, excluding the grooves 20, of the main region 500. Further, separating grooves 11 indicated by thick solid lines are formed along both sides of the first and second support regions 501a, 501b, 502a and 502b.

The width W of the main region 500 is approximately 10 micrometers to several hundred micrometers. The paired first support regions 501a and 501b have the same shape and the same size, and are arranged symmetrically with the center line of the main region 500. Further, the paired second support regions 502a and 502b have the same shape and the same size, and are arranged symmetrically with the center line of the main region 500. The length L1 of the first support regions 501a and 501b is equal to the length L2 of the second support regions 502a and 502b.

The upper reflecting layer 5 in the main region 500, the first support regions 501a and 501b and the second support regions 502a and 502b is separated from the upper reflecting layer 5 in the surrounding region by the separating grooves 11. Further, the first support regions 501a and 501b and the second support regions 502a and 502b are folded in a valley shape from the substrate 1 at the grooves 10, and the first support regions 501a and 501b, the second support regions 502a and 502b and the main region 500 are folded in a mountain shape.

Consequently, the upper reflecting layer 5 in the first support regions 501a and 501b and the upper reflecting layer 5 in the second support regions 502a and 502b stand on the substrate 1, and the upper reflecting layer 5 in the main region 500 faces parallel to the substrate 1 with spacing. Since a lower reflecting layer 2 is formed on the substrate 1 below the main region 500, as described later, the upper reflecting layers 5 in the first support regions 501a and 501b and the upper reflecting layer 5 in the second support regions 502a and 502b stand on the substrate 1 so that the upper reflecting layer 5 in the main region 500 is separated from the upper reflecting layer 5 in the surrounding region, the lower reflecting layer 2 on the substrate 1 is exposed below the upper reflecting layer 5 in the main region 500. Consequently, the upper reflecting layer 5 faces the lower reflecting layer 2 with spacing.

In the semiconductor device according to the present embodiment, the main region 500, the first support regions 501a and 501b, the second support regions 502a and 502b and the substrate 1 are folded while keeping a parallelogram thereamong. Accordingly, the upper reflecting layer 5 in the main region 500 is accurately parallel to the lower reflecting layer 2 on the substrate 1. Consequently, an optical resonator in which the lower reflecting layer 2 and the upper reflecting layer 5 face parallel to each other can be easily and accurately constructed.

FIGS. 3 to 6 are diagrams showing a method of fabricating the semiconductor device shown in FIGS. 1 and 2. FIGS. 3(a) and 3(b) are respectively a schematic plan view and a schematic front view showing a state where the upper reflecting layer has not stood yet in the steps of fabricating the semiconductor device shown in FIG. 1. FIGS. 4(a), 4(b) and 4(c) are respectively a cross-sectional view taken along a line A—A, a cross-sectional view taken along a line B—B and a cross-sectional view taken along a line C—C in the semiconductor device shown in FIG. 3. FIGS. 5(a) and 5(b) are respectively a schematic plan view and a schematic front view showing a state where the upper reflecting layer has already stood in the steps of fabricating the semiconductor device shown in FIG. 1. FIGS. 6(a), 6(b) and 6(c) are respectively a cross-sectional view taken along a line A—A, a cross-sectional view taken along a line B—B and a cross-sectional view taken along a line C—C in the semiconductor device shown in FIG. 5.

Figure 3:
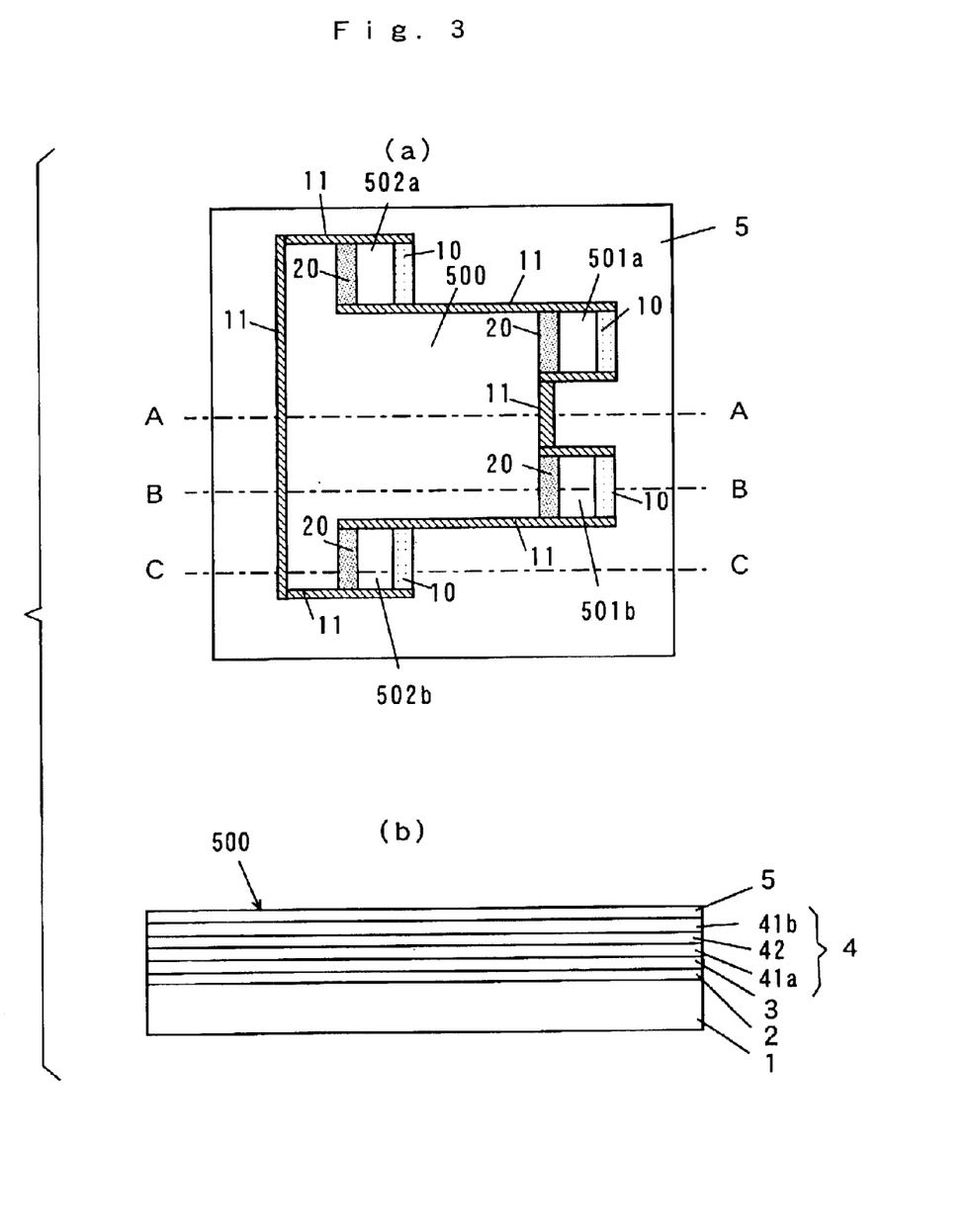
FIG. 3 is a schematic plan view and a schematic front view showing a state where an upper reflecting layer has not stood yet in the steps of fabricating the semiconductor device shown in FIG. 1.
Figure 4:
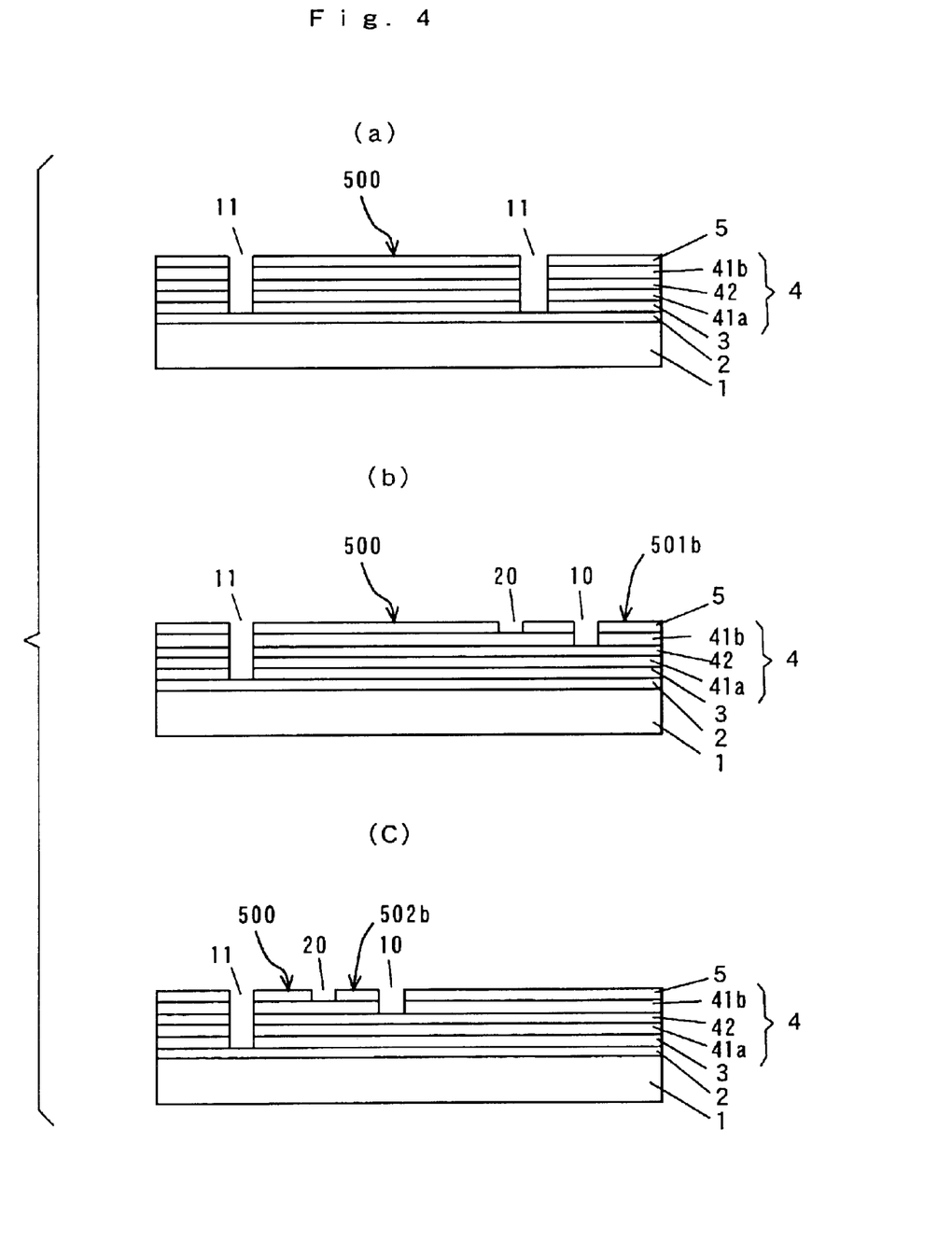
FIG. 4 is a cross-sectional view taken along a line A—A, a cross-sectional view taken along a line B—B and a cross-sectional view taken along a line C—C in the semiconductor device shown in FIG. 3.

As shown in FIGS. 3 and 4, a lower reflecting layer 2, a sacrifice layer 3 composed of AlGaAs, a strain layer 4 and an upper reflecting layer 5 are eptaxially grown in this order on a substrate 1 composed of GaAs.

The lower reflecting layer 2, the sacrifice layer 3, the strain layer 4 and the upper reflecting layer 5 are formed using an epitaxial growth technique such as MBE (Molecular Beam Epitaxy), MOCVD (Metal Organic Chemical Vapor Deposition), or CVD (Chemical Vapor Deposition).

The strain layer 4 is constituted by a first InGaAs layer 41a having a thickness of several nanometers to several ten nanometers, a GaAs layer 42 having a thickness of several nanometers to several ten nanometers, and a second InGaAs layer 41b having a thickness of several nanometers to several ten nanometers. In the present embodiment, the respective lattice constants of the first and second InGaAs layers 41a and 41b are larger than the lattice constant of the GaAs layer 42. Therefore, a strain due to the difference in the lattice constant is induced in the strain layer 4. The function of the strain layer 4 will be described later.

Furthermore, the lower reflecting film 2 and the upper reflecting layer 5 are composed of a distributed Bragg reflector film (hereinafter referred to as a DBR film). The DBR film has a stacked structure of AlGaAs and GaAs, as described later.

Grooves 10 are then formed in the upper reflecting layer 5 by photolithography and etching. As the etching, wet etching or RIE (Reactive Ion Etching) can be used.

The upper reflecting layer 5, the strain layer 4 and the sacrifice layer 3 are then removed by photolithography and etching, to form separating grooves 11. Consequently, the upper reflecting layer 5 surrounded by the separating grooves 11 is separated from the surrounding upper reflecting layer 5. In this case, the wet etching or the RIE is also used as the etching.

Figure 5:
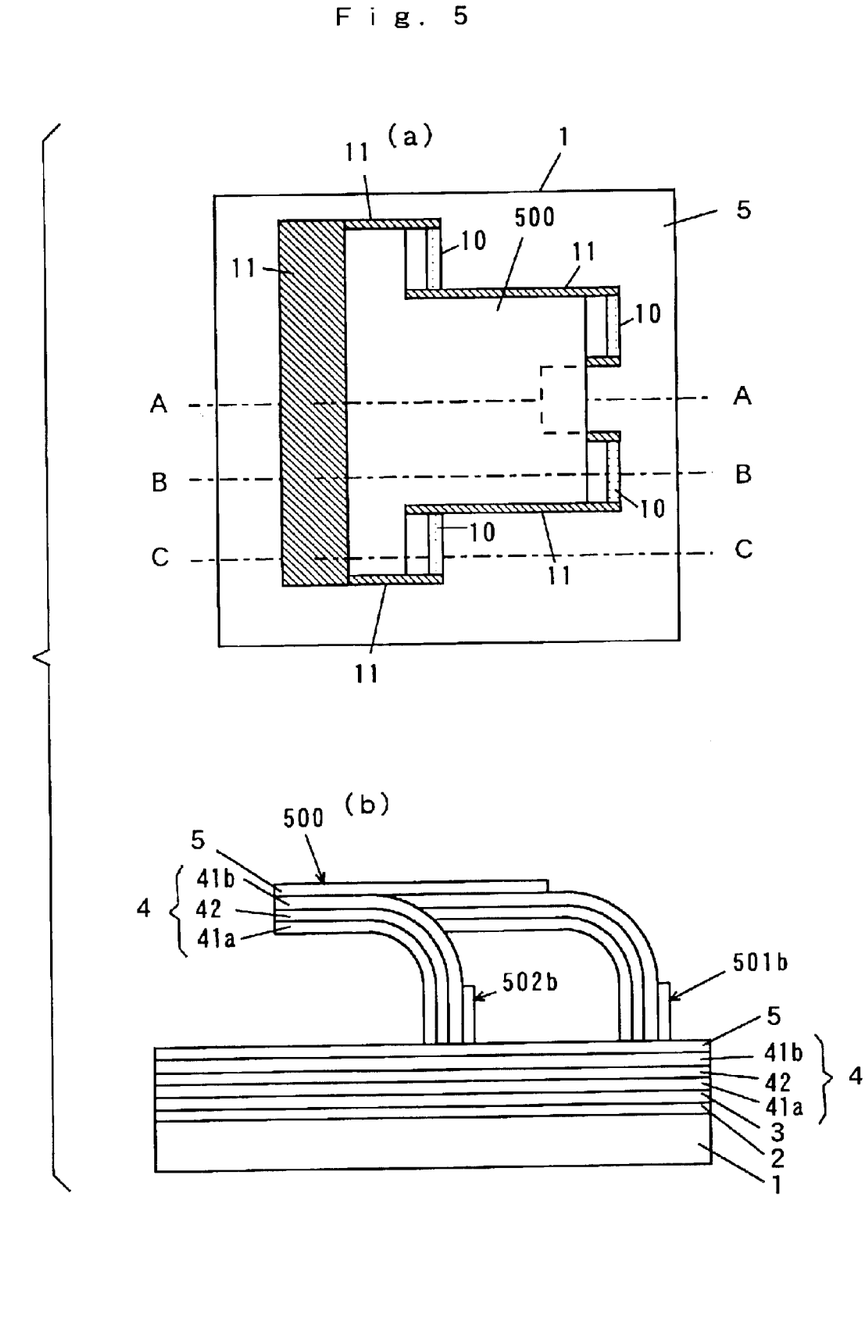
FIG. 5 is a schematic plan view and a schematic front view showing a state where an upper reflecting layer has already stood in the steps of fabricating the semiconductor device shown in FIG. 1.
Figure 6:
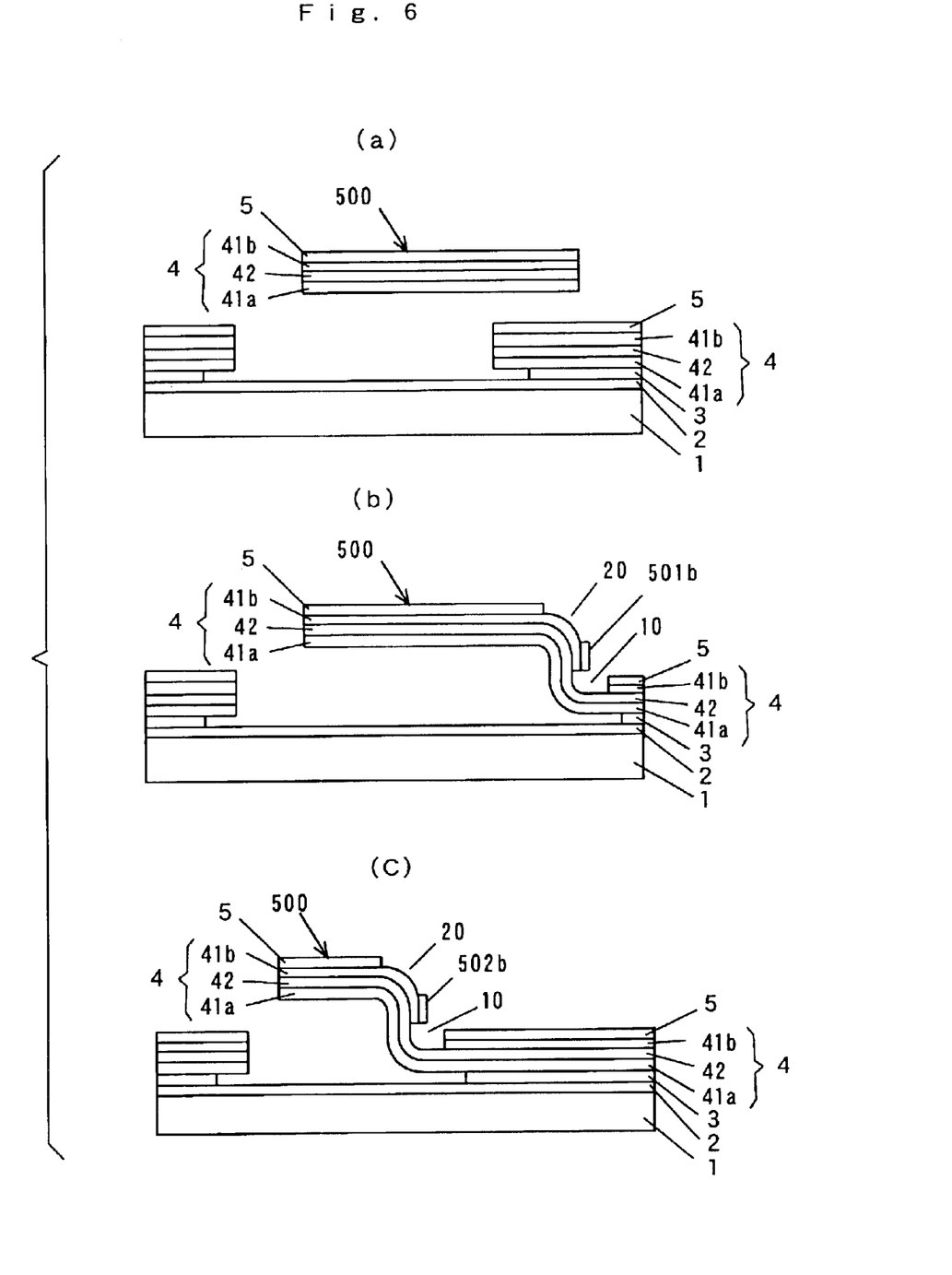
FIG. 6 is a cross-sectional view taken along a line A—A, a cross-sectional view taken along a line B—B and a cross-sectional view taken along a line C—C in the semiconductor device shown in FIG. 5.

Thereafter, the sacrifice layer 3 under the strain layer 4 is selectively etched by the wet etching. As a result, the strain layer 4 is curved in a valley shape below the grooves 10 and is curved in a mountain shape below the grooves 20 so as to relieve the strain caused by the difference in the lattice constant between the first and second InGaAs layers 41a and 41b and the GaAs layer 42 which constitute the strain layer 4, as shown in FIGS. 5 and 6. Consequently, the upper reflecting layer 5 is folded in a valley shape at the grooves 10 and is folded in a mountain shape at the grooves 20.

Figure 7:
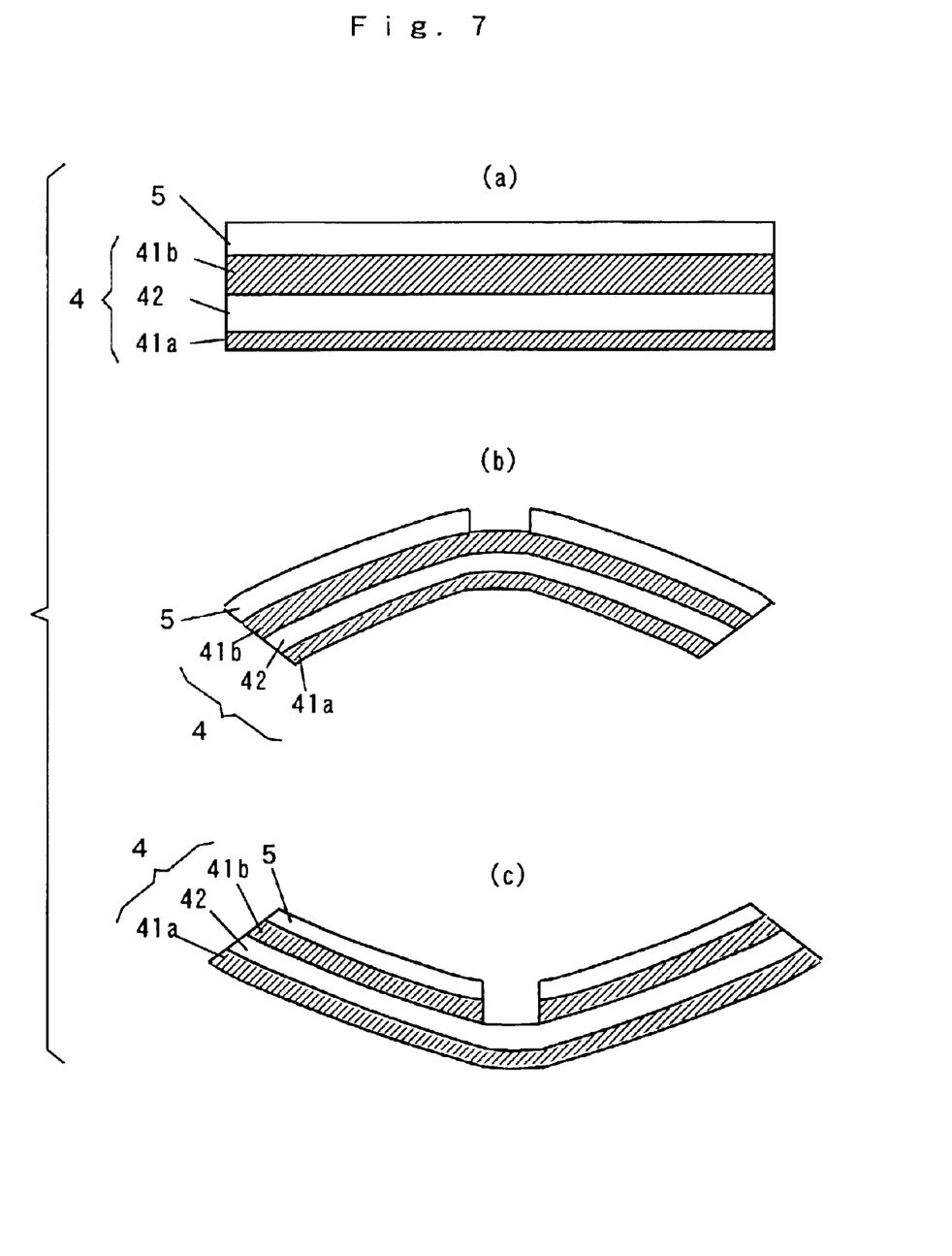
FIG. 7 is a schematic cross-sectional view showing the function of a strain layer.

Here, description is made of a method of folding the upper reflecting layer 5 in a mountain shape and a valley shape. FIG. 7 is a schematic cross-sectional view showing the strain layer 4, where FIG. 7(a) illustrates a state where it is not folded, FIG. 7(b) illustrates a state where it is folded in a mountain shape, and FIG. 7(c) illustrates a state where it is folded in a valley shape.

As shown in FIG. 7(a), the strain layer 4 has a structure in which a GaAa layer 42 is interposed between a first InGaAs layer 41a and a second InGaAs layer 42b. The second InGaAs layer 42b has a thickness larger than the first InGaAs layer 41a. The upper reflecting layer 5 is formed on the second InGaAs layer 42b.

In this case, the first InGaAs layer 41a and the second InGaAs layer 41b respectively have lattice constants larger than the GaAs layer 42. Accordingly, the first InGaAs layer 41a is exerted so as to curve the GaAs layer 42 upward, and the second InGaAs layer 41b is exerted so as to curve the GaAs layer 42 downward. In this state, the upper reflecting layer 5 is formed on the second InGaAs layer 41b, whereby the strain layer 4 is not curved.

As shown in FIG. 7(b), when the upper reflecting layer 5 is etched until the second InGaAs layer 42b is exposed, the second InGaAs layer 41b is exerted so as to curve the GaAs layer 42 downward because the thickness of the first InGaAs layer 41a is larger than the thickness of the second InGaAs layer 41b. Consequently, the upper reflecting layer 5 is folded in a mountain shape in an etched portion.

As shown in FIG. 7(c), when the upper reflecting layer 5 and the second InGaAs layer 41b are etched such that the GaAs layer 42 is exposed, the first InGaAs layer 41a is exerted so as to curve the GaAs layer 42 upward. Consequently, the upper reflecting layer 5 is folded in a valley shape in an etched portion.

The upper reflecting layer 5 can be thus folded in a valley shape and a mountain shape by using the strain layer 4 as well as adjusting the etching depth.

In this case, the respective thicknesses of the first and second InGaAs layers 41a and 41b, the thickness of the GaAs layer 42, and the In composition ratio in the first and second InGaAs layers 41a and 41b are most suitably selected, thereby making it possible to cause the upper reflecting layer 5 to stand perpendicularly to the substrate 1.

For example, the thickness of the first InGaAs layer 41a is set to 10 nm, and the thickness of the GaAs layer 42 is set to 10 nm. Further, when the In composition ration X in the first InGaAs layer 41a having a composition of $In_xGa_{1-x}As$ is set to 0.2, the strain layer 4 stands perpendicularly to the GaAs substrate 1.

The difference in the lattice constants between InGaAs and GaAs can be changed to approximately 7% by changing the In composition ratio in the first InGaAs layer 41a.

When it is assumed that the thickness t1 of the first InGaAs layer 41a and the thickness t2 of the GaAs layer 42 are equal to each other, the following relationship holds among the thickness t1 of the first InGaAs layer 41a, the thickness t2 of the GaAs layer 42, the In composition ratio X in the first InGaAs layer 41a, and the radius of curvature R of the strain layer 4:

$$R=(2/3)\cdot(a/\Delta a)\cdot\Delta d$$

Here, a denotes the lattice constant of GaAs, which is 5.6533 Å. Further, $\Delta a$ denotes the difference between the lattice constant of $In_xGa_{1-x}As$ and the lattice constant of GaAs. The lattice constant of $In_{0.2}Ga_{0.8}As$ is 5.7343 Å. Further, d denotes the sum of the thickness t1 of the first InGaAs layer 41a and the thickness t2 of the GaAs layer 42. When t1=t2 =10 [nm], d=20 [nm]. In this example, R=0.944 [μm]. The length of a circular arc of a curved region is set to 1.483 μm.

Figure 8:
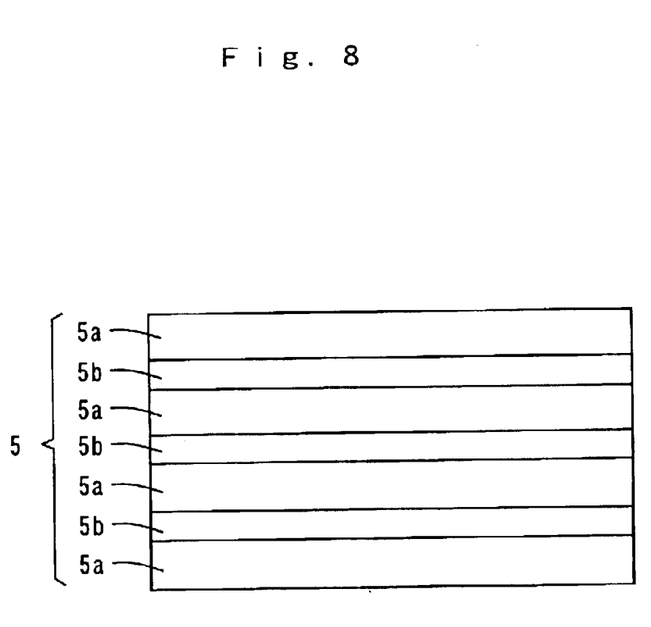
FIG. 8 is a schematic cross-sectional view showing the detailed structure of an upper reflecting layer.

FIG. 8 is a schematic cross-sectional view showing the detailed structure of the upper reflecting layer 5. The structure of the lower reflecting layer 2 is the same as the structure of the upper reflecting layer 5.

As shown in FIG. 8, the upper reflecting layer 5 has a stacked structure obtained by alternately stacking a plurality of AlGaAs layers 5a and a plurality of GaAs layers 5b. The respective periods of the AlGaAs layer 5a and the GaAs layer 5b are 4 to 20.

The thickness $d_1$ of the AlGaAs layer 5a and the thickness $d_2$ of the GaAs layer 5b in the upper reflecting layer 5 are set, as expressed by the following equations:

$$d_1=\lambda/(4n_1) \qquad (1)$$

$$d_2=\lambda/(4n_2) \qquad (2)$$

Here, λ denotes an emission wavelength, and $n_1$ and $n_2$ respectively denote the refractive indexes of the AlGaAs layer 5a and the GaAs layer 5b.

Generally, the phase of an electromagnetic wave is not changed when the electromagnetic wave is incident on a material having a low refractive index to a material having a high refractive index, while being changed by π when it is incident on a material having a high refractive index to a material having a low refractive index. When the AlGaAs layer 5a and the GaAs layer 6b satisfy the foregoing equations (1) and (2), the phases of refracted waves in the respective layers are uniform, thereby obtaining a high reflectivity.

The upper reflecting layer 5 may be constructed by alternately stacking aluminum oxide layers obtained by oxidizing AlAs and AlGaAs layers.

In the above-mentioned manner, the optical resonator in which the lower reflecting layer 2 and the upper reflecting layer 5 face parallel to each other is easily and accurately constructed.

The semiconductor device according to the present invention can be fabricated easily and at low cost by a normal planar technique such as photolithography, etching, or epitaxial growth.

Although the optical resonator is constructed by providing the lower reflecting layer 2 between the substrate 1 and the sacrifice layer 3 and causing the upper reflecting layer 5 and the lower reflecting layer 2 to face parallel to each other in the semiconductor device according to the above-mentioned embodiment, the lower reflecting layer 2 may not be provided. In this case, the upper reflecting layer 5, which is separated from the substrate 1, in the main region 500 and the upper reflecting layer 5 on the substrate 1 partially face each other. Consequently, an optical resonator can be constructed by regions of the upper reflecting layer 5 in the main region 500 and the upper reflecting layer 5, which partially faces the upper reflecting layer 5 in the main region 500, on the substrate 1.

As indicated by broken lines in FIG. 2, a first electrode 510 may be formed in at least one of the first support regions 501a and 501b and the second support regions 502a and 502b, and a second electrode 511 may be arranged so as to face the first electrode 510. In this case, when a voltage is applied across the first electrode 510 and the second electrode 511, an electrostatic force is exerted between the first electrode 510 and the second electrode 511. By changing the voltage to be applied between the first electrode 510 and the second electrode 511, therefore, the respective angles of the first support regions 501a and 501b and the second support regions 502a and 502b can be changed, to change the distance between the lower reflecting layer 2 and the upper reflecting layer 5. As a result, the resonant wavelength of the optical resonator can be changed. The optical resonator according to the present embodiment can be used as a variable optical resonator. In this case, the first electrode 510 and the second electrode 511 correspond to a driving part and a driving force generation part.

Furthermore, a first inductor may be formed in at least one of the first support regions 501a and 501b and the second support regions 502a and 502b, and a second inductor may be arranged so as to face the first inductor. Consequently, it is possible to control the respective angles of the first support regions 501a and 501b and the second support regions 502a and 502b by an electromagnetic force, to change the distance between the lower reflecting layer 2 and the upper reflecting layer 5. As a result, the resonant wavelength of the optical resonator can be changed. In this case, the first inductor and the second inductor correspond to a driving part and a driving force generation part.

The strain layer 4 may be heated by causing a current to flow through the strain layer 4. Consequently, the degree of the curvature of the strain layer 4 is adjusted, thereby making it possible to change the respective angles of the first support regions 501a and 501b and the second support regions 502a and 502b. Further, the strain layer 4 can be easily curved by thermally expanding the first and second InGaAs layers 41a and 41b. In this case, n-type or p-type impurities are doped in order to provide conductivity to the first and second InGaAs layers 41a and 41b.

The respective angles of the first support regions 501a and 501b and the second support regions 502a and 502b can be also changed to angles other than right angles by changing a voltage applied to the strain layer 4 or a current flowing through the strain layer 4.

Although in the above-mentioned embodiment, the pair of first support regions 501a and 501b and the pair of second support regions 502a and 502b are provided, the respective numbers of first support regions and second support regions are not limited to the same. For example, at least one first support region and at least one second support region may be provided.

Although in the above-mentioned embodiment, a stacked structure of the InGaAs layer and the GaAs layer is used as the strain layer 4, the present invention is not limited to the same. For example, a combination of various semiconductor layers respectively having different lattice constants can be used. Another stacked structure of Group III-V compound semiconductors and another stacked structure of Group II-VI compound semiconductors may be used as the strain layer 5. Further, a stacked structure of semiconductor layers containing Si (silicon) and Ge (germanium) may be used as the strain layer.

Although in the above-mentioned embodiment, a substrate composed of GaAs is used, another substrate such as a Si substrate may be used in consideration of materials for the sacrifice layer, the strain layer, and the reflecting layer.

Although in the above-mentioned embodiment, AlGaAs is used as the material for the sacrifice layer, the present invention is not limited to the same. For example, another material may be used in consideration of selective etching.

Furthermore, the materials for the upper reflecting layer and the lower reflecting layer are not limited to those in the above-mentioned embodiment. For example, arbitrary materials can be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor device comprising in the following order:

a substrate;

a first layer;

a second layer; and a third layer, said second layer comprising a stacked structure of a plurality of semiconductor layers having different lattice constants respectively, said third layer comprising a main region, a first support region and a second support region, said first and second support regions respectively connecting with said main region through first and second lines and respectively connecting with the surrounding region through third and fourth lines, said first, second, third and fourth lines being arranged parallel to each other, a separating groove having a depth reaching said first layer from said third layer so as to surround said main region, said first support region and said second support region in a portion excluding said first, second, third and fourth lines, and said first layer in said main region, said first support region and said second support region being selectively removed, and said second layer being folded in a valley shape at said third and fourth lines and folded in a mountain shape at said first and second lines by a strain exerted in said second layer, said first and second support regions standing on said third layer on said substrate, and said main region being opposed to said substrate with spacing.

2. The semiconductor device according to claim 1, wherein said third layer comprises a first reflecting layer, a second reflecting layer is provided between said substrate and said first layer, and said first reflecting layer in said main region faces said second reflecting layer on said substrate.

3. The semiconductor device according to claim 1, wherein said third layer comprises a reflecting layer, and said reflecting layer in said main region faces partially said reflecting layer in the surrounding region.

4. The semiconductor device according to claim 1, wherein said second layer comprises a first semiconductor layer having a first lattice constant, a second semiconductor layer having a second lattice constant smaller than said first lattice constant, and a third semiconductor layer having a third lattice constant larger than said second lattice constant, and said third layer at said third and fourth lines and said third semiconductor layer are removed such that said second layer is folded in a valley shape at said third and fourth lines, and said third layer is removed at said first and second lines such that said second layer is folded in a mountain shape at said first and second lines.

5. The semiconductor device according to claim 1, further comprising a driving part for changing the respective angles of said first and second support regions which stand on said third layer on said substrate.

6. The semiconductor device according to claim 5, wherein said driving part comprises a driving force generation part for changing the respective angles of said first and second support regions by a driving force comprising an electrostatic force or an electromagnetic force.

7. The semiconductor device according to claim 1, wherein said first support region comprises a plurality of first support regions, and said second support region comprises a plurality of second support regions.

8. A semiconductor device comprising in the following order:

a first layer;

a second layer; and a third layer, said second layer comprising a first semiconductor layer having a first lattice constant, a second semiconductor layer having a second lattice constant smaller than said first lattice constant, and a third semiconductor layer having a third lattice constant larger than said second lattice constant, a separating groove having a depth reaching said first layer from said third layer being formed so as to partially surround a predetermined region, and said first layer in said predetermined region being selectively removed, and said third layer and said third semiconductor layer at said first line being removed such that said second layer is folded in a valley shape at the first line in said predetermined region, and said third layer being removed at said second line such that said second layer is folded in a mountain shape at the second line in said predetermined region.

9. A semiconductor device comprising in the following order:

a first layer;

a second layer; and a third layer, said second layer comprising a stacked structure of a plurality of semiconductor layers having different lattice constants respectively, a separating groove having a depth reaching said first layer from said third layer being formed so as to partially surround a predetermined region, and said first layer in said predetermined region being selectively removed, and a groove having a first depth being formed at a first line such that said second layer is folded in a valley shape at said first line by a strain exerted in said second layer in said predetermined region, and a groove having a second depth different from said first depth being formed at a second line such that said second layer is folded in a mountain shape at said second line by the strain exerted in said second layer in said predetermined region.

10. The semiconductor device according to claim 9, wherein said second layer comprises in the following order a first semiconductor layer having a first lattice constant, a second semiconductor layer having a second lattice constant smaller than said first lattice constant, and a third semiconductor layer having a third lattice constant larger than said second lattice constant.

11. A semiconductor device comprising a stacked structure of a plurality of semiconductor layers having different lattice constants respectively, the stacked structure including a first layer sandwiched between two layers respectively having larger lattice constants than the first layer; and a groove having a predetermined depth being formed at a predetermined line such that said stacked structure is folded in a mountain shape at said line by a strain exerted in said stacked structure.

12. A semiconductor device comprising a stacked structure of a plurality of semiconductor layers having different lattice constants respectively, the stacked structure including a first layer sandwiched between two layers respectively having larger lattice constants than the first layer; and a groove having a predetermined depth being formed at a predetermined line such that said stacked structure is folded in a valley shape at said line by a strain exerted in said stacked structure.

13. A semiconductor device comprising a stacked structure of a plurality of semiconductor layers having different lattice constants respectively, a groove having a first depth being formed at a first line such that said stacked structure is folded in a valley shape at said first line by a strain exerted in said stacked structure; and a groove having a second depth being formed at a second line such that said stacked structure is folded in a mountain shape at said second line by the strain exerted in said stacked structure.

* * * * *